United States Patent
Raab

[11] Patent Number: 6,012,551
[45] Date of Patent: Jan. 11, 2000

[54] APPARATUS FOR AUTOMATIC LUBRICANT DELIVERY

[75] Inventor: Björn Raab, Bramerhaven, Germany

[73] Assignee: Gerhard Döhring, Mülheim/Ruhr, Germany

[21] Appl. No.: 08/945,430

[22] PCT Filed: Apr. 15, 1995

[86] PCT No.: PCT/EP96/01577

§ 371 Date: Oct. 15, 1997

§ 102(e) Date: Oct. 15, 1997

[87] PCT Pub. No.: WO96/33366

PCT Pub. Date: Oct. 24, 1996

[30] Foreign Application Priority Data

| Apr. 15, 1995 | [DE] | Germany | 19514232 |
| Jul. 20, 1995 | [DE] | Germany | 19526461 |
| Aug. 7, 1995 | [DE] | Germany | 19528914 |

[51] Int. Cl.[7] .................................................. F16N 7/14
[52] U.S. Cl. ............... 184/7.4; 184/105.2; 200/517; 200/302.2
[58] Field of Search .................. 184/7.4, 105.1, 184/105.2, 27.3, 37, 38.4, 39, 108; 222/333, 390; 200/5 A, 513, 517, 302.2, 80, 81.9 M, 82 E; 335/205, 219

[56] References Cited

U.S. PATENT DOCUMENTS

| 2,770,697 | 11/1956 | Kellett | 335/205 |
| 3,098,907 | 7/1963 | Reed et al. | 335/205 |
| 4,796,787 | 1/1989 | Tsuyuki | 222/333 |
| 4,895,220 | 1/1990 | Abraham et al. | 184/6.4 |
| 5,271,528 | 12/1993 | Chien | 184/38.4 |
| 5,381,874 | 1/1995 | Hadank et al. | 184/6.4 |
| 5,404,966 | 4/1995 | Yang | 184/39 |
| 5,597,051 | 1/1997 | Moriya et al. | 184/6.4 |
| 5,634,531 | 6/1997 | Graf et al. | 184/7.4 |
| 5,664,429 | 9/1997 | Isaji | 62/278 |
| 5,671,825 | 9/1997 | Wong et al. | 184/6.4 |
| 5,788,012 | 8/1998 | Yang | 184/6.4 |
| 5,796,056 | 8/1998 | Bredow et al. | 200/517 |

FOREIGN PATENT DOCUMENTS

| 1256 001 | 12/1967 | Germany . |
| 92 14 096.3 | 2/1993 | Germany . |
| 43 30 793 | 6/1994 | Germany . |
| WO89/08800 | 9/1989 | WIPO . |

OTHER PUBLICATIONS

274 Betriebstechnik, 32, Dec. 1991, No. 12, Grafelfing, DE "Sicher und sparsam", p. 22.

Primary Examiner—Tamara Graysay
Assistant Examiner—Chong H. Kim
Attorney, Agent, or Firm—Ware, Fressola, Van der Sluys & Adolphson LLP

[57] ABSTRACT

An automatic lubricant-dispensing device with a piston (3) disposed in a cylinder (4) and an electric motor drive unit (1,2) connected thereto has a circuit closer (21) to protect the device against moisture and/or explosion.

24 Claims, 11 Drawing Sheets

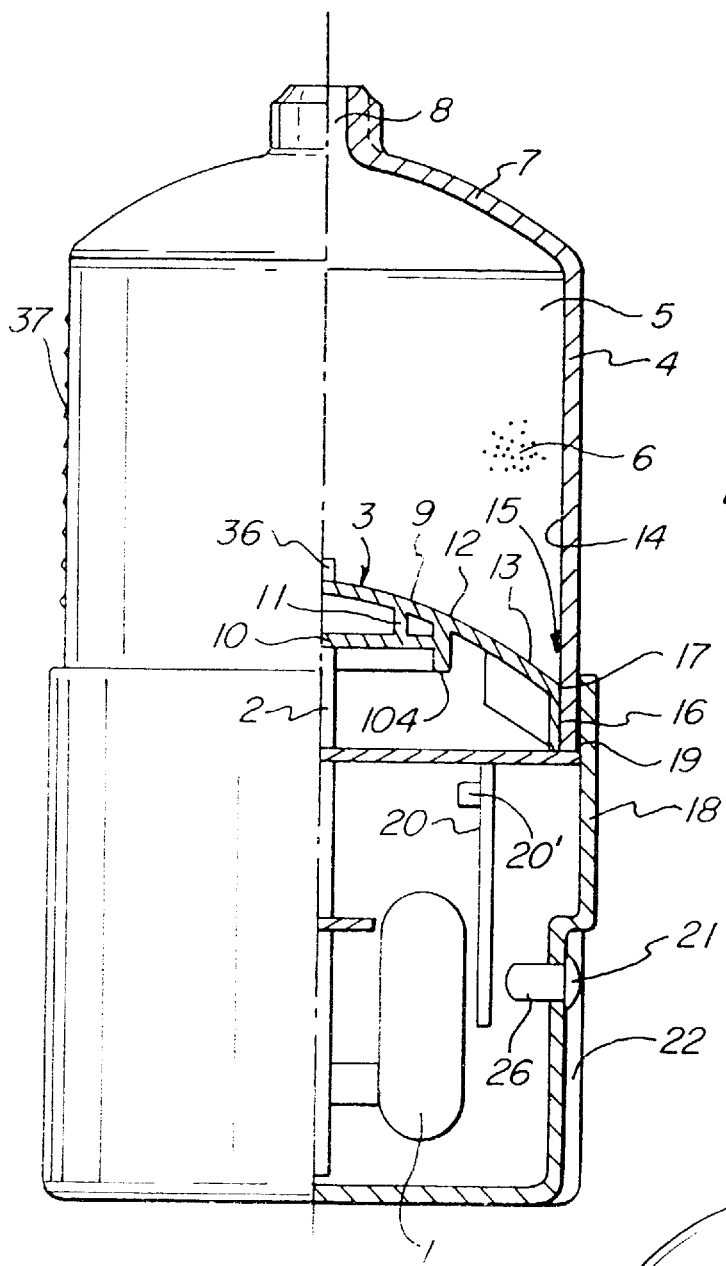
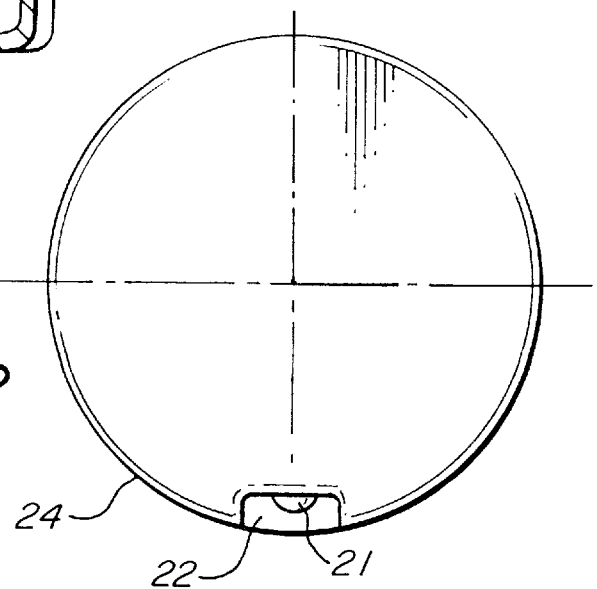
FIG. 1a
FIG. 2

APPARATUS FOR AUTOMATIC LUBRICANT DELIVERY

BACKGROUND OF THE INVENTION

1. Technical Field

The invention concerns an apparatus for automatic lubricant delivery, comprising a piston arranged in a cylinder, and a drive means connected thereto.

2. Description of the Prior Art

Such an apparatus is known from German patent specification No 43 21 452 or DE-U-92 14 096. While German patent specification No 43 21 452 proposes a construction in which lubricant is directly pressed out of the cylinder by means of a pressure piston and therefore the lubricant is disposed directly in the cylinder itself, the construction of DE-U-92 14 096 proposes fitting a lubricant pack or cartridge into the cylinder and expelling it by means of a piston. The two known constructions suffer from a number of disadvantages. Thus the disadvantage of the construction disclosed in German patent specification No 43 21 452 is in particular that, when the lubricant is urged out of the cylinder, the piston is subjected to very different loadings because of its geometrical shape and has a tendency to tip away slightly at the outer edge which is opposite the inside wall surface of the cylinder, or to form a gap between the piston and the inside wall surface of the cylinder, through which gap lubricant can pass into the region of the drive. The measures proposed in that publication for sealing the gap between the piston and the inside wall surface of the cylinder are at any event completely inadequate. Furthermore the lubricant dispenser is only activated by setting the dispensing time with a graduation at the desired time intervals, by electronic control, which is disadvantageous in particular when the lubricant dispenser is disposed at locations which are only accessible with difficulty and which scarcely permit setting of the dispensing time. Furthermore the design configuration of the means for setting the dispensing time in the apparatus is not very economical by virtue of the frequent one-off use thereof.

In the lubricant dispenser known from DE-U-92 14 096.3, admittedly no sealing problem is involved by virtue of the lubricant being disposed in a lubricant pack or cartridge, but the lubricant pack of cartridge cannot be completely emptied as the piston is of a stepped configuration in cross-section and the lubricant pack or cartridge cannot in principle be entirely emptied. Thus residues always remain behind in the lubricant pack or cartridge so that this arrangement only affords less than optimum utilization of the entire amount of lubricant in the lubricant pack or cartridge. Furthermore, in the case of the known lubricant dispenser, it is possible for them to give rise to explosions under adverse environmental conditions.

The object of the present invention, in an apparatus for automatic lubricant delivery, comprising a piston disposed in a cylinder and a drive connected thereto, is to avoid the disadvantages from which the state of the art suffers.

In accordance with the invention that is achieved with an apparatus for automatic lubricant delivery, as set forth in claim 1. Advantageous developments of the invention are recited in the appendant claims.

It is highly advantageous if the apparatus according to the invention has an on switch or circuit closer switch which is protected in relation to spray or splash water and which complies with international standard ID 65. Spray water protection is achieved by a suitable sealing arrangement for the on switch, whereby at the same time the entire apparatus for automatic lubricant delivery is protected against explosion. After activation of the on switch, the apparatus can only be switched off by cutting off the power supply. The preferred relinquishment of a switch-off function does not cause any problems because the automatic lubricant dispenser virtually never has to be switched off, but, by virtue of a preset lubricant delivery amount per day or other unit of time, remains in operation until all lubricant has been discharged from the cylinder.

The on switch or circuit closer switch is preferably in the form of a cylindrical pin co-operating with a contact means which is in the form of a spring contact disc. The spring contact disc is disposed on a board together with the other electrical components for controlling the discharge of lubricant. The spring contact disc is of a cup-like convex cross-sectional shape as long as the apparatus is not yet activated. Disposed opposite the spring contact disc is the on switch which is disposed in an opening in the wall of the housing of the apparatus. When the on switch which is in the form of an activation pin is pressed into the housing the front part of the activation pin or the on switch pushes the convex shape of the spring contact disc into a concave shape and the contact disc which is bent in that way and which is electrically conducting simultaneously touches two contacts which are arranged below the contact disc and by which the apparatus is started when contact occurs.

Preferably the activation pin has two projections which extend therearound and which are disposed at a spacing relative to each other corresponding to the wall thickness of the housing. In the non-activated condition one of the projections is disposed on the outside of the housing and the other projection is disposed on the inside of the housing. Upon activation, the projection disposed on the outside of the housing is pushed through the opening in the housing until the projection which previously was on the outside of the housing is on the inside and prevents the activation pin from moving back out of the housing. Sealing means disposed beneath the head of the activation pin bear against the housing on the outside thereof after the activation pin has been pushed in, and seal off the interior of the housing relative to the outside thereof. A further sealing action for the housing is achieved by the projection which bears at the inside against the inside wall surface of the housing.

Preferably the on switch is arranged in a depression in the housing of the apparatus and upon activation therefore does not project beyond the outside periphery of the lubricant dispenser.

The invention is also based on the realization that a piston of a shape which is convex in cross-section is very easy to produce and also does not have any tendency in the edge region to open up a gap between the piston and the cylinder. In particular however by virtue of the line guidance of the piston which is of a convex cross-section, a sealing body can preferably be accommodated in a onepiece sealing lip which in the event of high pressure in the cylinder is automatically pressed against the inside wall surface of the cylinder and the edge of the piston and thus provides for a very good sealing effect.

The fact that the cylinder head is adapted to the convex shape of the piston also ensures that the lubricant can be entirely discharged from the apparatus.

It is also desirable if the apparatus has a microprocessor and a memory connected thereto and the apparatus can be preset by way of those means for a predetermined quantitative discharge of lubricant per unit of time which can only still be triggered off by the on switch.

For the purposes of observing emptying of the apparatus according to the invention the cylinder wall is at least partially of a transparent material so that the silhouette of the piston or the sealing body can be seen from the exterior. In addition, a scale in the form of alphanumeric or abstract characters is provided along the main axis of the cylinder so that it is possible to provide an accurate assessment about the emptying of the lubricant from the cylinder. Such a display device is very simple to produce and to read off and is also highly accurate. It is precisely if the cylinder wall is of plastic material that the transparency or translucency of the entire cylinder wall can be very easily achieved.

For the sake of improved reading-off, it is desirable if the upper edge of the piston or the sealing body is provided with a clearly visible color, for example a signal color.

It may be desirable for the apparatus to be switched over from the winter mode of operation to the summer mode of operation and to store corresponding quantity/time presettings in a non-volatile memory. The change-over switching action can be triggered off by means of a further switch. That provides for optimum lubricant supply by adaptation to the usual external temperatures in the winter time and the summer time respectively.

The drive means for the automatic lubricant dispenser can be an electrical dc or ac motor, as is frequently used as such in electrical engineering.

It is however particularly advantageous to use a stepping motor which drives the piston within the cylinder of the lubricant dispenser.

The advantage here is in particular that a stepping motor can be better controlled for the purpose according to the invention because, in dependence on electrical signals, for example a number of electrical pulses, it reacts with degree accuracy and thus with less dependency on temperature influence than is the case with for example dc motors. The use of a stepping motor thus permits overall simpler actuation of the drive by a control board which in particular has a pulse counting device and a device which controls the stepping distance of the motor in dependence on the electrical pulses applied. In that way the stepping motor can also be switched off when it has pressed the piston into the delivery region of the cylinder. That is achieved by a number of stepping motor control pulses being preset in a memory and the stepping motor or the lubricant dispenser being switched off as soon as that number is attained. The device for switching off the stepping motor thus comprises a comparator or a control unit having a comparison program which compares the number of pulses already set with the stored maximum pulse number and in dependence thereon transmits a control signal to the stepping motor and enables a further movement of the stepping motor by a predetermined number of steps or switches off the stepping motor.

The pulse generation device can be a pulse/control signal generator which generates pulses in dependence on time, for example ten pulses per day, or in dependence on the requirement of the machine unit to be lubricated, so that in a mode of operation which is independent of a machine, the stepping motor and therewith the piston performs a given stepwise deflection within a given unit of time while in the case of actuation which is linked to a machine the pulse generator produces the necessary number of pulses on demand.

BRIEF DESCRIPTION OF THE DRAWINGS

The invention is described in greater detail hereinafter by means of an embodiment. In the drawings:

FIG. 1a is a partial cross-sectional view of an alternative embodiment of the invention, FIG. 2 is a view from the bottom of FIG. 1 along.

DETAILED DESCRIPTION OF THE INVENTION

Figure 1:
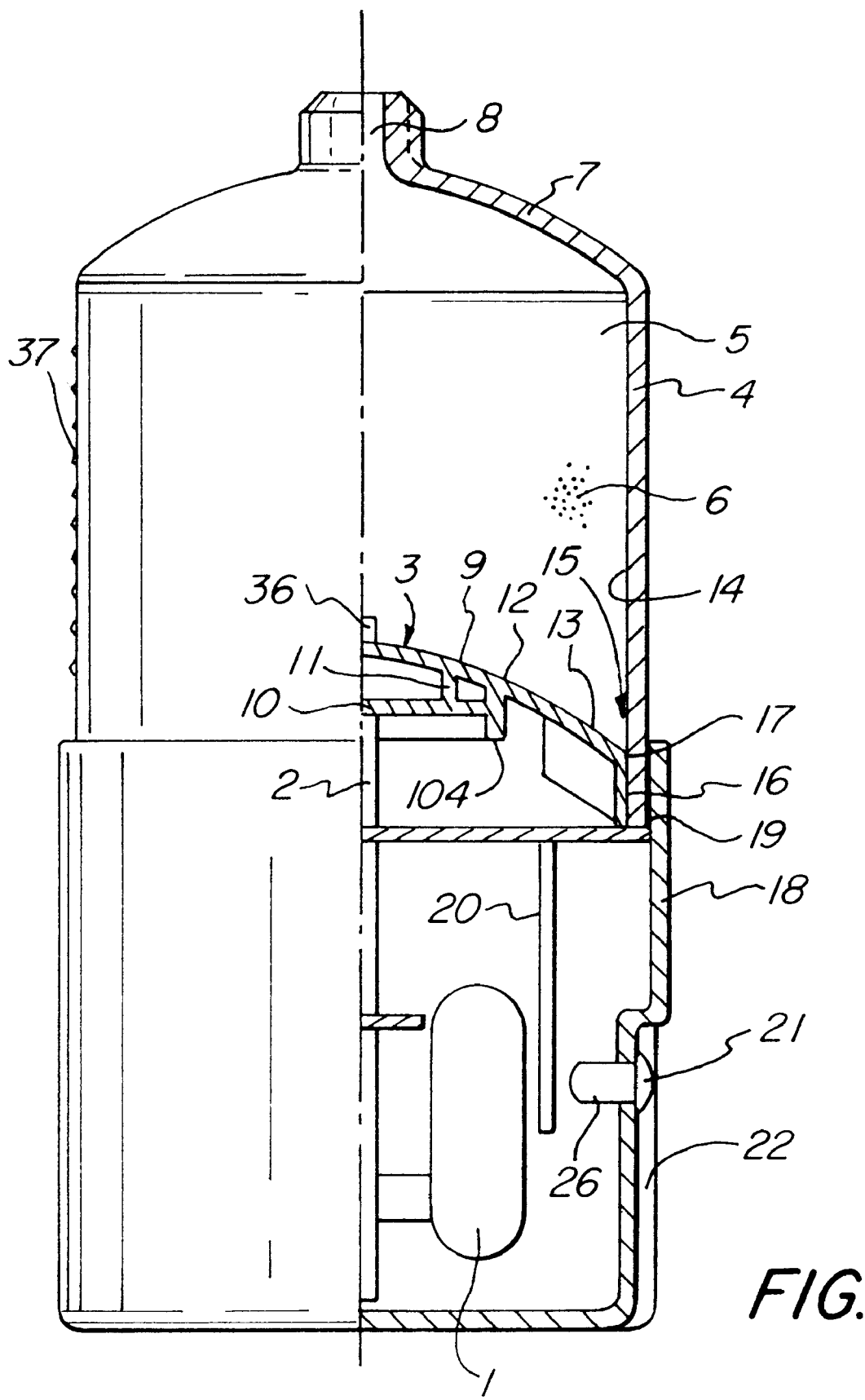
FIG. 1 is a partially cross-sectional view of an apparatus according to the invention for automatic lubricant delivery.

FIG. 1 shows an electrically operated automatic lubricant dispenser having an electric-motor drive which, by way of a forward feed bar 2 or a spindle drives a piston 3. A battery 1 serves to provide the power supply for the drive. The nature and configuration of the drive itself is comparable to the constructions disclosed in German patent specification No 43 21 452 or DE-U-92 14 096. The piston 3 is disposed within a cylinder 4 which accomodates in its interior 5 a lubricant 6 or another liquid or gaseous medium. An outlet 8 for the discharge of the lubricant or liquid medium is provided in the cylinder head region 7.

In cross-section the piston is of a convex shape 9 which is suitably adapted to the shape of the cylinder in the cylinder head region 7. On the rear side the piston has a spindle plate 10 which is engaged by the spindle 2 for the forward feed movement of the piston. The spindle plate extends over a part of the rear side of the piston and is connected to the crown 12 of the piston by way of one or more web portions 11 and is also centered by way of a centering element 104. Provided between the edge 13 of the piston 3 and the inside wall surface 14 of the cylinder 4 is a gap 15 which permits displacement of the piston 3 within the cylinder 4. The gap is so small that the lubricant cannot pass through the gap. To improve the sealing effect a one-piece sealing lip 17 is disposed on the piston edge 13 over the gap 15 as a sealing body 16. The sealing lip 17 rises from the piston edge towards the inside wall surface of the cylinder so that when there is a high pressure in the interior 5 of the cylinder 4, the sealing lip 17 is pressed against the inside wall surface 14 of the cylinder and on the piston 3.

While the piston is arranged in the cylinder, the means for driving the piston 3 are arranged in the housing 18 which adjoins the cylinder 4 and which fits around the cylinder in the overlap region 19.

The housing 18 and the cylinder 4 are connected together releasably, for example by a screwthread. That permits separation of the emptied cylinder from the housing and the same time permits arresting of a filled cylinder by a housing 18 after the piston 3 is retracted into its starting position. If the cylinder is non-releasably connected to the housing, it is possible, after releasing a locking means for preventing a return movement, which in operation of the automatic lubricant dispenser prevents the return movement of the piston into its starting position, to fill the automatic lubricant dispenser again and make it ready for operation, by introducing lubricant into the cylinder by way of the outlet opening 8.

It is also desirable for the insides of the housing, that is to say the drive and the electrical parts, to be releasably connected thereto so that, after consumption of the lubricant, the cylinder and the housing and preferably also the piston can be separated from the drive and the electronic actuating parts thereof and passed along for controlled and deliberate disposal thereof, which is simple in particular if the housing 18, the cylinder 4 and also the piston 3 comprise plastic material and can thus be fed to a plastic recycling process after consumption of the lubricant and detachment from the drive and the electronic control parts thereof. The drive and the electronic control thereof can then be re-used for re-constituting a new lubricant dispenser, which is meaningful in term of environmental friendliness and which is economically highly advantageous by virtue of the option of multiple use of the drive and its electronic actuating parts. That generally reduces the cost of manufacture of the automatic lubricant dispenser. In addition, in accordance with the principle that the polluter pays, disposal of the lubricant dispenser is left to the person who also produces the lubricant dispenser, thereby reducing the disposal capacities on the part of the user of the lubricant dispenser.

If the housing and the cylinder are releasably connected together, an empty cylinder can be easily replaced by a re-filled cylinder and the emptied cylinder can then be fed to plastic material recycling. The different principles and options in regard to re-usability of individual components of the automatic lubricant dispenser are described hereinafter.

The lubricant dispenser also has in the housing 18 a board 20 on which are arranged a microprocessor 54 (FIG. 7), for example an ASIC, and memory means as well as further control means for suitably controlling the drive of the piston.

The electronic system is so preset by storage of the appropriate values that the automatic lubricant dispenser delivers a given amount of lubricant, for examle 2 or 4 g, per unit of time, for example per day. That preset delivery is started by means of the on switch and subsequently can only be stopped by switching off the supply voltage of a battery disposed in the apparatus. Normally however there is no need to switch off the apparatus and the lubricant dispenser operates until it is completely empty.

FIG. 2 is a view on to the rear part of the lubricant dispenser. It can be seen therein that the on switch 21 which is described in greater detail hereinafter is disposed in a recess 22 in the circular-cylindrical housing 18 and thus does not project beyond the outside periphery 24 of the housing 18. Accordingly the on switch 21 is disposed in a protected position within the form of the housing and does not present any engagement surface for articles which project to the lubricant dispenser.

Figure 3:
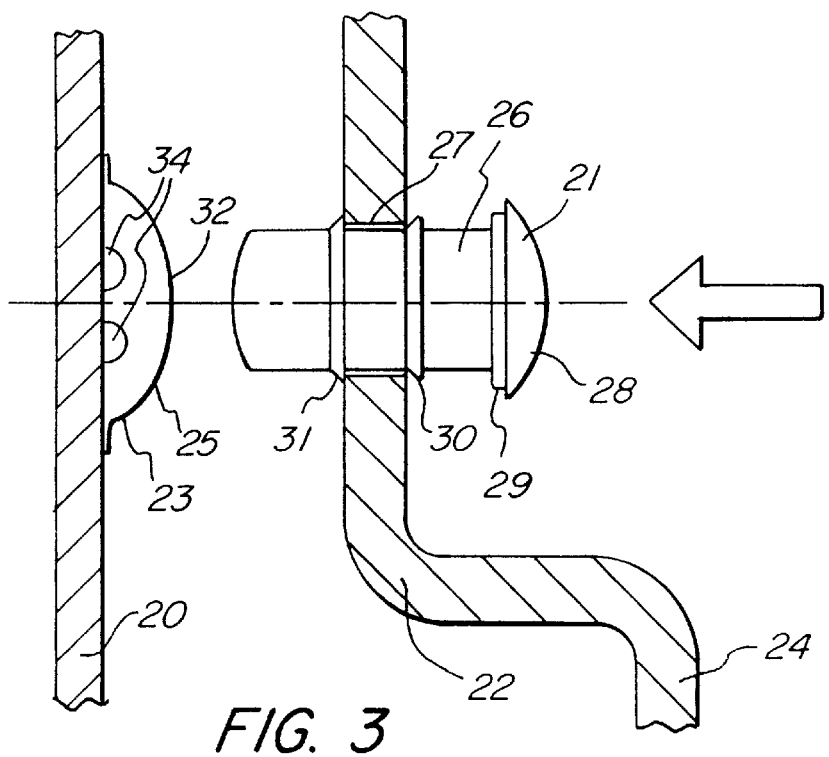
FIG. 3 shows a view of part of FIG. 1 in the non-activated condition.

FIG. 3 is a view on an enlarged scale of a part of the on switch 21 and the co-operation thereof with a contact means 25, in the non-activated condition. The on switch comprises a cylindrical pin 26 which fits in an opening 27 in the housing 18. The pin has a pin head 28 whose diameter is larger than that of the opening 27. A sealing ring 29 is disposed beneath the pin head. In addition the cylindrical part of the pin 26 has two projections 30 and 31 which are bevelled in one direction and whose mutual spacing corresponds to the wall thickness of the housing 18. The peripherally extending projections 30 and 31 whose diameter is larger than that of the opening 27 provide that the pin 26 is pre-fixed in the wall of the housing. By virtue of their bevel configuration the pin 26 can be inserted from the outside into the housing 18 but as soon as the second projection 31 has passed through the opening 27 the switch 21 can only be pulled out of the opening 27 by applying a large amount of force. In the interior of the housing, a spring contact disc 23 is associated with the on switch 21, on the board 20, as a contact means 25. In the non-active condition the contact disc 23 provides a convex or cup-like curvature 32 of a metal plate, beneath which are disposed two contacts 34; the conductive connection of the two contacts 34 causes the apparatus to be switched on.

Figures 4, 4A, 4B:
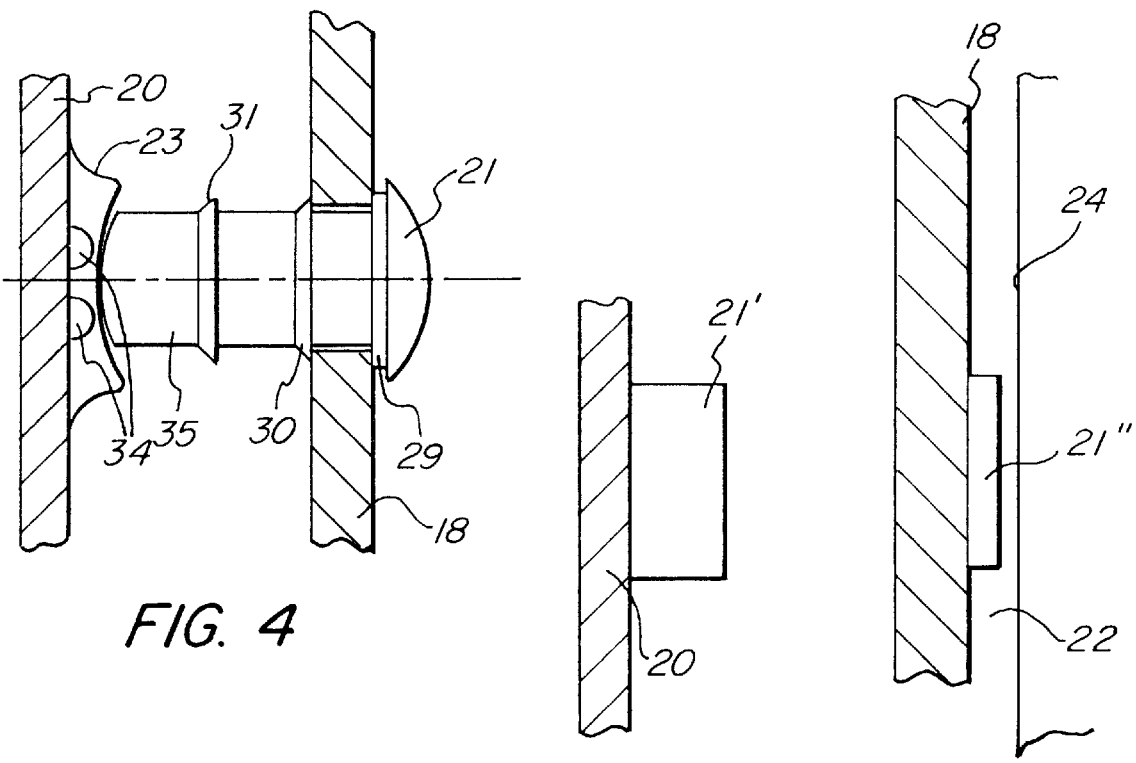
FIG. 4 shows a part of FIG. 1 upon activation of the apparatus.
FIG. 4a shows a second embodiment of the activation/deactivation switch.
FIG. 4b shows a third embodiment of the activation/deactivation switch.

FIG. 4 shows activation of the lubricant dispenser after the pin 26 has been pressed into the housing 18. The curved part 32 of the spring contact disc 25 is pressed down by the front part 35 of the activation pin 26 to such an extent that the spring contact disc simultaneously contacts the contacts 34 which are disposed beneath it and thus makes an electrical connection between the two contacts 34.

This contacted condition is maintained through deformation of the spring contact disc 23 and thus the lubricant dispenser is still switched on even if the pin 26 is moved away thus the switch 21 does not have a switch-off function. In an alternative embodiment the spring contact disc 23 can flex back again into its starting position shown in FIG. 3 if the pin 26 is moved away thus decoupling the electrical parts for the drive of the automatic lubricant dispenser from the power supply.

It will also be seen that the second projection 30 of the pin 26 lies within the housing 18 and inhibits the on switch 21 from being pulled out. At the same time however it also seals off the interior of the lubricant dispenser outwardly and inwardly relative to the outside of the lubricant dispenser. The seal 29 which bears in a pressed condition between the pin head 28 and the outside wall surface of the housing 18 provides a further sealing action. The illustrated sealing measures provide for protection from spray or splash water and also protection from explosion as the interior of the housing is sealed off in relation to influences from the outside, and also the exterior of the housing is shielded relative to disturbances which may occur, for example sparking or electrical flash-over phenomena. Such protection is necessary in particular when such a lubricant dispenser is used in mining where it is absolutely essential to prevent explosions from being triggered off.

As an alternative to the activation/deactivation as shown in FIGS. 3–4, FIG. 4a shows contact-less activation/ deactivation of the control means and the electric-motor drive. The contact-less activation/deactivation of the lubricant delivery apparatus utilizes a magnetic switch 21' which is arranged within the housing 18 of the lubricant delivery apparatus, and a unit 21" for exciting the magnetic switch, for example a coil, which is arranged outside the housing 18 of the lubricant delivery apparatus. It should be noted that the magnetic switch excitation unit 21" lies within the outside periphery 24 of the housing 18 and is electromagnetically coupled to the unit to be lubricated.

Figure 5A:
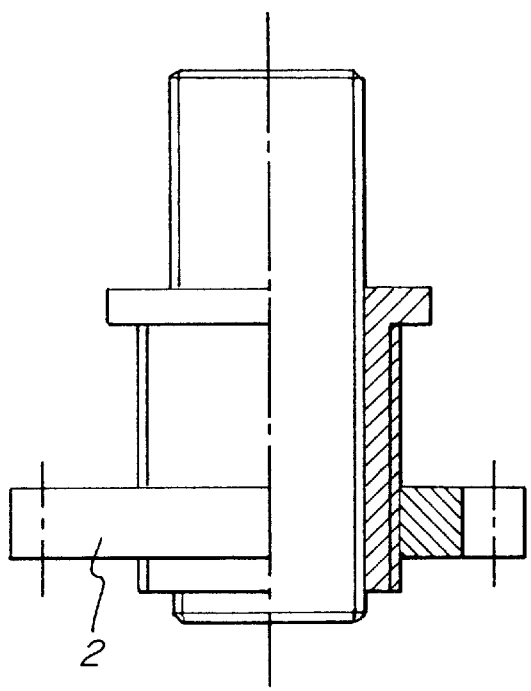
FIGS. 5a and 5b show a particular embodiment of the drive in the form of a telescopic spindle with a driven gear in the unextended and the extended conditions.
Figure 5B:
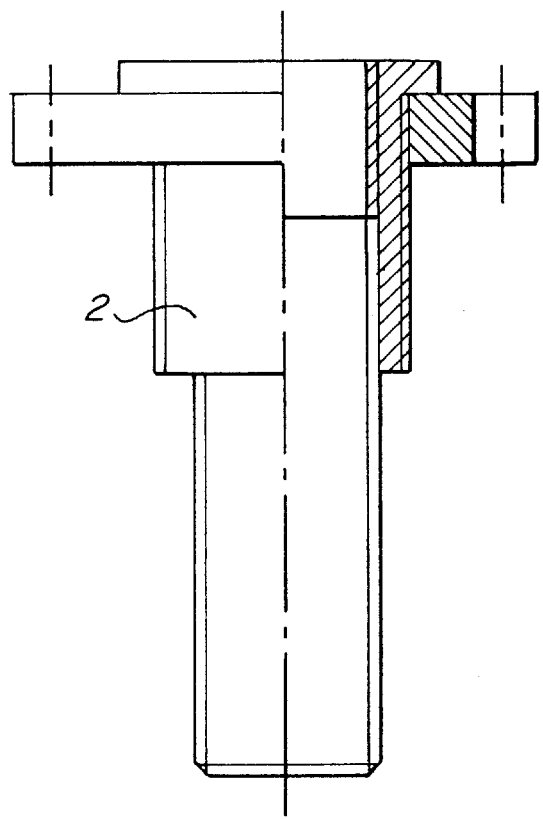

In FIG. 5a thereof, shows a telescopic spindle—comprising one or more stages—with a driven gear, in the unextended condition, while FIG. 5b shows the telescopic spindle extended to a condition of maximum displacement. The use of a telescopic spindle for driving the piston results in saving a great deal of space and in addition represents a highly accurate means for driving the piston because even very small variations in length can be produced with a telescopic spindle.

So that the lubricant in the cylinder is not exposed to an excessively high pressure by virtue of the further forward drive movement of the piston as a result of a reduced consumption of lubricant, for example when the unit to be lubricated is switched off, it has proven to be highly advantageous to provide a pressure sensor 36 which is coupled to the microprocessor and which, when a given pressure in the cylinder is exceeded, switches off the apparatus until the pressure has fallen below a predetermined value. As illustrated in FIG. 1, such a pressure sensor 36 may be used within the cylinder 4 but also in the rear region of the housing 18 if the pressure sensor can measure the force acting on the piston.

Preferably the pressure sensor 36 is arranged on the apex point of the piston 3 so that it can project into the outlet region 8 of the cylinder as the piston moves forwardly in order then also to urge the last remains of the lubricant out of the outlet region.

For reading off the forward drive movement of the piston the entire cylinder or only a part thereof is translucent, that is to say transparent. That can be achieved in a particularly simple manner if the cylinder comprises a plastic material or glass. When the piston is advanced the viewer can see the edge of the piston or the sealing lip through the transparent housing of the cylinder and can thus arrive at an assessment about the previous consumption of lubricant.

For more accurate assessment it has been found highly advantageous if, in the transparent region along its main axis the cylinder has a scale in the form of alphanumeric characters or abstract characters like simple lines. In that case, under some circumstances it is highly advantageous if a given amount of lubricant delivery corresponds to the spacing between the scale marks and if a corresponding association between the amount of lubricant discharged and the spacing between the scale marks on the housing is documented. In that way the viewer can then very rapidly determine the amount of lubricant delivered and arrive at information about the amount of lubricant which is still present. The smaller the spacings between the scale marks, the more accurate is the assessment that can be achieved in that way.

As, when the delivery of lubricant is preset to for example 4 g per day, lubricant delivery occurs in a stepwise manner, the delivery display is particularly accurate when a scale mark is associated with the set delivery mount per unit of time.

To make the delivery amount easier to read off, it is desirable if the piston edge 13 or the sealing lip 17 is of a striking colour configuration so that there is a very clearly visible difference between the piston edge 13 and the transparent material. In order more quickly to read off the delivery amount it may also be desirable in some circumstances for each scale marking to be provided with a serial number which makes it easier to count off the delivery amount.

To provide the power supply for the lubricant dispenser it is possible to use a replaceable battery or an accumulator, but also a utility-powered voltage supply.

Instead of a spindle it is naturally also possible to produce the forward feed movement of the piston by way of a screw drive which normally has a considerably higher level of efficiency than a spindle but which sometimes requires rather more space.

By virtue of pre-setting of the metering action, it is possible to eliminate setting means, which hitherto were always provided in relation to lubricating means, for regulating the metered amounts of lubricant, and that lightens the overall structure of the lubricant dispenser and permit more reliable delivery of lubricant.

Figure 7:
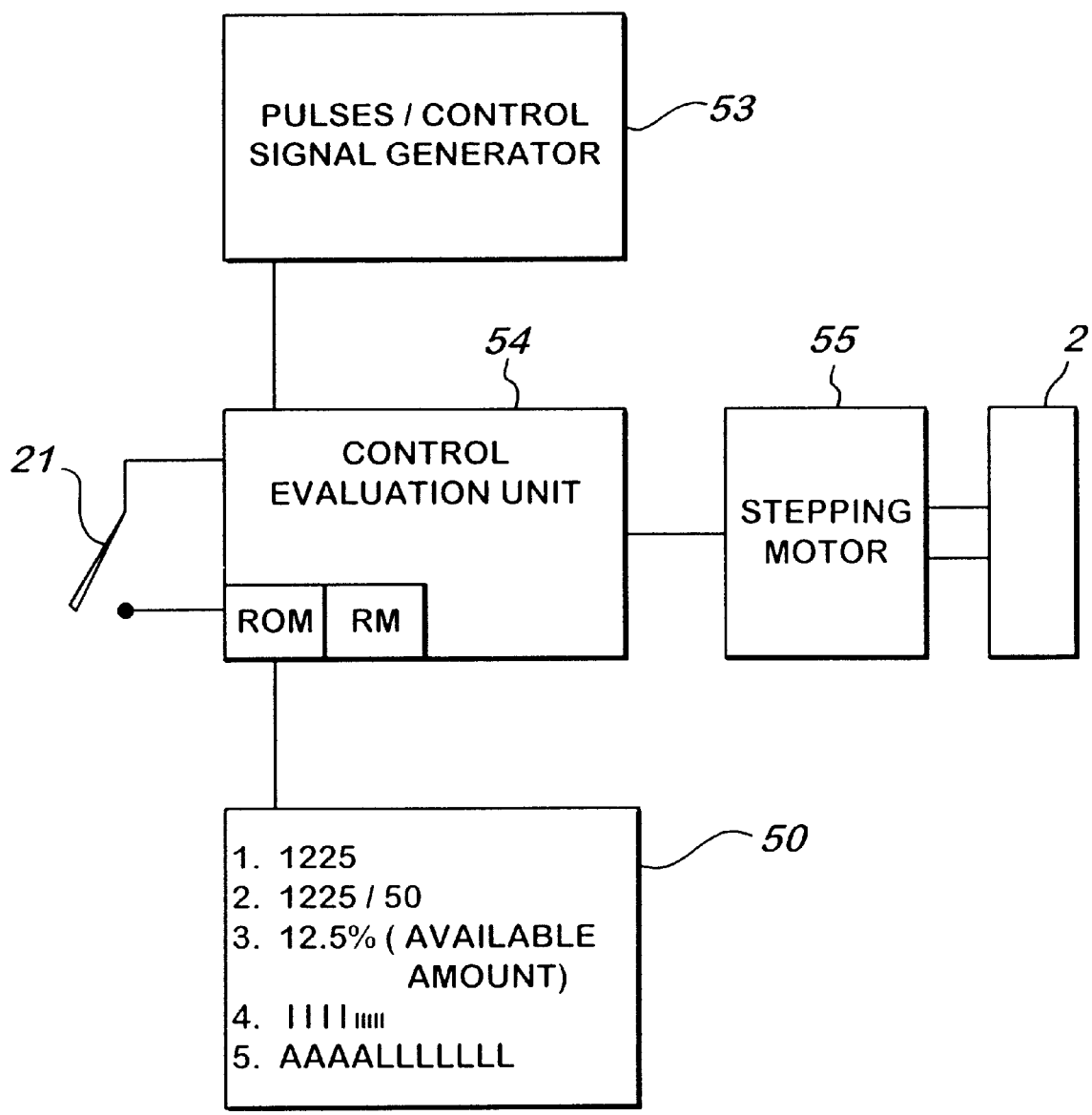
FIG. 7 is a block circuit diagram showing the principle of electrical actuation of the lubricant dispenser.

As best seen in FIG. 7, it is desirable and advantageous for the drive used to be a stepping motor 55 which drives the spindle 2 or the piston 3 forwards in dependence on the electrical pulses or signals supplied. For that purpose provided on the board 20 is a pulse/control signal generator 53 which within a predetermined unit of time generates a given number of electrical pulses/control signals and feeds those signals to a control-evaluation unit 54 of the stepping motor 55, as shown in FIG. 7. That provides an actuating means or a drive which is independent of external influences and which in particular avoids in principle the disadvantages of a temperature dependency which usually occurs in the case of direct-current drives. In that way also it is possible to provide for switching off the lubricant dispenser or the stepping motor, insofar as provided in the control-evaluation unit 54 is a counterevaluation unit which counts the control pulses outputted to the stepping motor, puts them into intermediate storage in a volatile memory (RAM) and compares them to a predetermined value 'maximum pulse number' which is stored in a non-volatile memory (ROM). The 'maximum pulse number' corresponds to the maximum forward feed movement of the piston 3 in the cylinder when the piston touches the inside wall surface of the cylinder in the cylinder head region 7. The evaluation unit then compares the number of outputted control pulses to the value 'maximum pulse number' and the control unit 54 switches off the stepping motor when the number of counted control pulses corresponds to the number of the stored 'maximum pulse number'. If the number of counted control pulses is below the 'maximum pulse number' the forward feed movement of the spindle or the piston by the stepping distance corresponding to the outputted control pulse is enabled.

The delivery of lubricant as such as switched on as a already described above by the switch 21 which is connected to the control unit.

Figure 6:
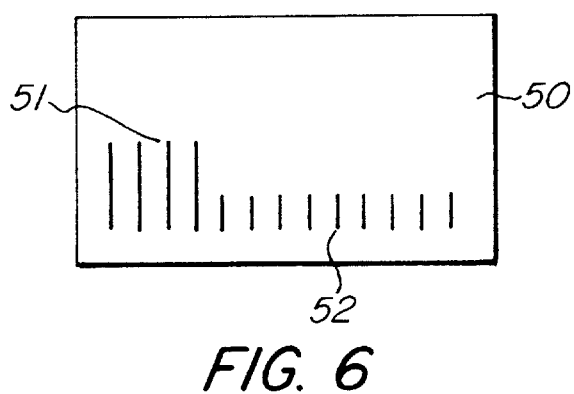
FIG. 6 is a representational view of a display.

If the lubricant dispenser is provided with or connected to a suitable display unit 50 in the form of a display as shown in FIG. 6 the number of outputted counting pulses and thus a measurement in respect of the delivered amount of lubricant or a measurement in respect of the remaining amount of lubricant can be displayed there, either in absolute figures (for example 1225) or as a percentage (for example 12.5%) and/or in relation to the total number (1225/5000) so that the user of the lubricant dispenser can always be very accurately informed about the deflection movement of the piston and about the amount of lubricant which has been delivered or which still remains in the lubricant dispenser.

The display can also be produced in such a way that the display 50 has two different kinds of alphanumeric or abstract characters, namely a first group of characters which consists of a number of first characters 51 (FIG. 6), wherein the number of first characters is proportional to the number of control pulses outputted to the stepping motor, and a second group of characters consisting of a second number of characters, wherein the number of the first and second characters is proportional to the number of the total possible control pulses and is thus a measurement in respect of the total amount of lubricant. An incremental display of that kind, precisely in relation to a stepping motor as an incremental drive, is very simple and highly accurate in regard to the absolute display of absolute and very fine variations in the amount of lubricant delivered or the residual amount of lubricant.

For limit switching-off of the stepping motor, instead of the pressure sensor it is possible to provide a current draw monitoring device which switches off the electronic system and therewith the lubricant dispenser as soon as a maximum motor current draw value which has been previously programmed in is exceeded.

In the case of a machine-dependent control situation, that is to say when the machine unit to be lubricated outputs control signals to the lubricant dispenser in accordance with the lubricant demand of the machine unit, the display arrangement permits a very accurate display about the amount of lubricant delivered in absolute figures, that is to say in ml per unit of time, and from that the machine maintenance personnel also obtains further information about the condition and wear of the machine to be lubricated. Under some circumstances that facilitates decision-making about further operation of the machine to be lubricated or the replacement of certain assemblies which are shortly going to fail.

In FIG. 1, in order to be able to monitor the amount of lubricant which is delivered when using a dc motor, it can also be provided that a metal projection in the form of a pin or peg is disposed on a gear of the transmission and rotates with that gear. In each revolution of said gear the path of movement of that pin or peg goes past a diode or other detection means 20', and that triggers off a signal pulse. That signal is detected by the microprocessor 54 on the board and fed to a counter which counts the signals which are triggered off by the diode. When the number of signals counted by the counter reaches a given value which corresponds to a value at which the lubricant medium is completely urged out of the dispenser or the piston is in its position of maximum forward feed movement, the microprocessor switches off the drive system.

In the case of machine-dependent control of the automatic lubricant dispenser it is provided that the lubricant dispenser is activated and deactivated in a contact-less manner by means of a magnetic switch. For that purpose a magnetic switch is so disposed on the board 20 that it is as close as possible to the wall of the cover of the housing. A coil is also disposed on the cover of the housing, and that coil, in the event of a flow of current, switches the magnetic switch in the interior of the housing and activates or deactivates the drive. If there is no voltage applied to the coil, the drive system is deactivated. If voltage is applied to the coil, the drive system is activated. The voltage signals which are fed to the coil are supplied by the machine unit to be lubricated and the contact-less control of the drive permits mechanical decoupling between voltage-carrying lines outside the housing from the interior of the housing and thus avoids automatically possible flash-over voltages. That ensures effective protection from explosion and water, for the automatic lubricant dispenser.

The coil, preferably cast with an iron core in plastic material, is so designed that it can be pressed with a simple manual operation into a depression provided for that purpose in the housing and thus lies within the contour of the housing, in a manner comparable to the pin 21. The encapsulation of the interior of the lubricant dispenser relative to the exterior, as described above, provides for highly effective and inexpensive protection from explosions and spray or splash water, for the automatic lubricant dispenser.

When the automatic lubricant dispenser is completely emptied, there are in principle two alternatives regarding further use of the automatic lubricant dispenser. For that reason it is advantageous on the one hand only to replace the components which are subjected to a high loading and which can be inexpensively replaced. That is for example the cylinder, the housing 15 and the piston 5, which, in the case of being releasably connected to the drive and the electronic control parts, for example the board 20, can be separated therefrom after emptying of the lubricant from the lubricant dispenser, and passed to a controlled plastic material recycling process.

If the housing and the cylinder are releasably connected together, release of that connection should be possible only by means of a special tool which is suitable for that purpose in order to prevent improper separation of the housing and the cylinder, with corresponding consequences.

If in addition the entire insides of the housing, in particular the drive and the electronic control components, are designed to be releasable from the housing, it may also be advantageous if, after separation of the activation pin, the spring contact disc can be moved back into its initial form as shown in FIG. 3, by means of suitable measures. As an alternative thereto however the impressed spring contact disc can also be replaceable by a spring contact disc which has not yet been pressed in, by fitting a new spring contact disc into a suitable holder on the board 20.

When the insides of the automatic lubricant dispenser are re-used as described above, plastic parts of the cylinder and the housing are passed for recycling or disposal and thus automatically separated from the electrical metal parts of the drive system. That modular construction has major advantages in regard to manufacture of the lubricant dispenser.

A further alternative for bringing the automatic lubricant dispenser into operation again is the provision of a switchable locking device for return movement of the piston, which device permits the piston to move into its original starting position when the cylinder is refilled. The cylinder can then be filled by introducing lubricant into the cylinder by way of the outlet opening 8, the piston being urged back into its starting position simultaneously with the operation of filling the cylinder with lubricant.

Depending on the sector of use and the location of use, one alternative or the other for reusing and refilling the automatic lubricant is advantageous.

Figure 8A:
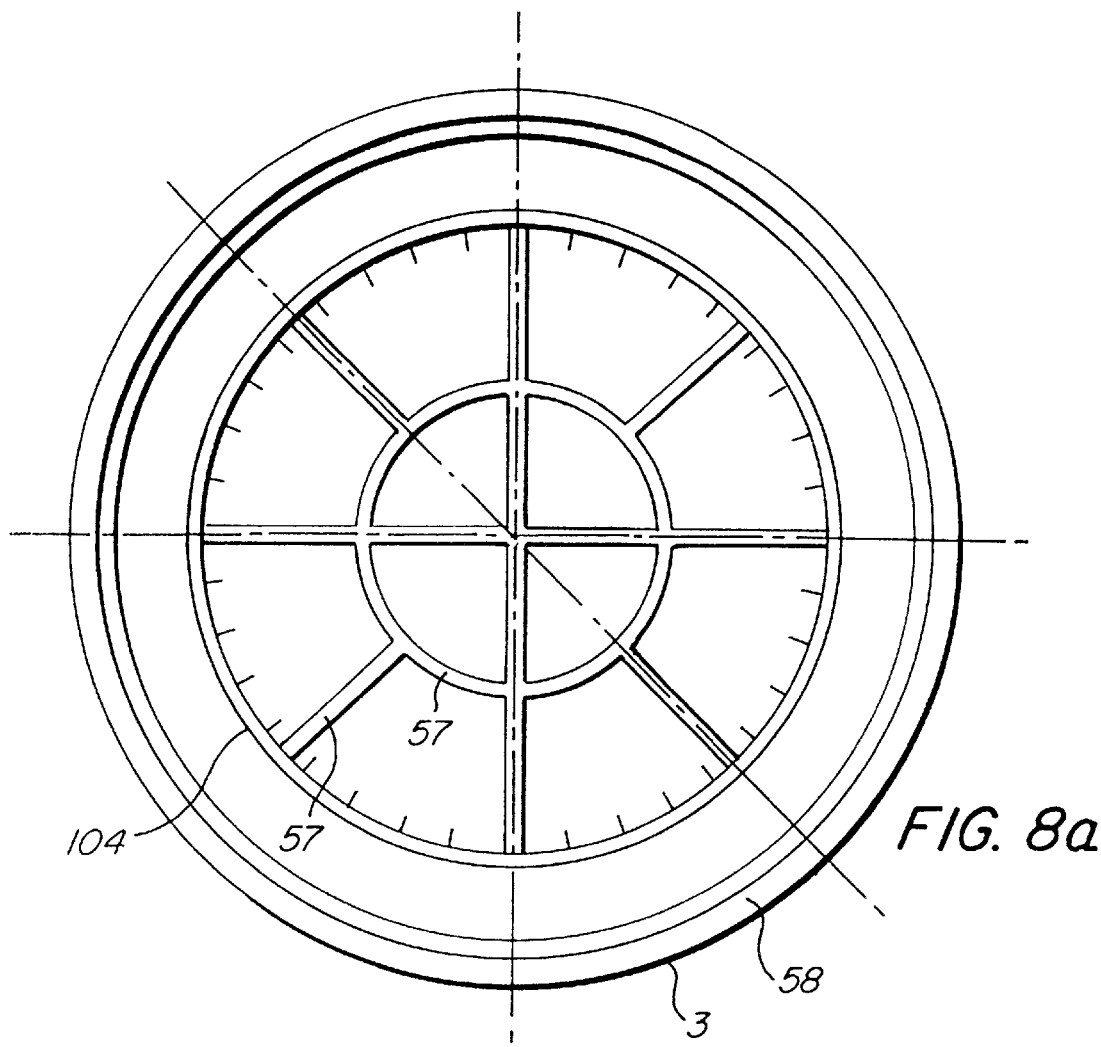
FIG. 8a is a view from below of a piston used for the lubricant dispenser according to the invention.

FIG. 8*a* is a view from below of a piston 3 with corresponding strut and stiffening elements 57 for resisting deformation of the piston when the apparatus is brought into operation. In view of the fact that the pressure in the lubricant cavity can be four bars and more, such stiffening elements 57 are desirable. The piston is also provided with an O-ring 58 in order to ensure good sealing integrity between the interior of the cylinder and the wall surface of the cylinder.

Figure 8B:
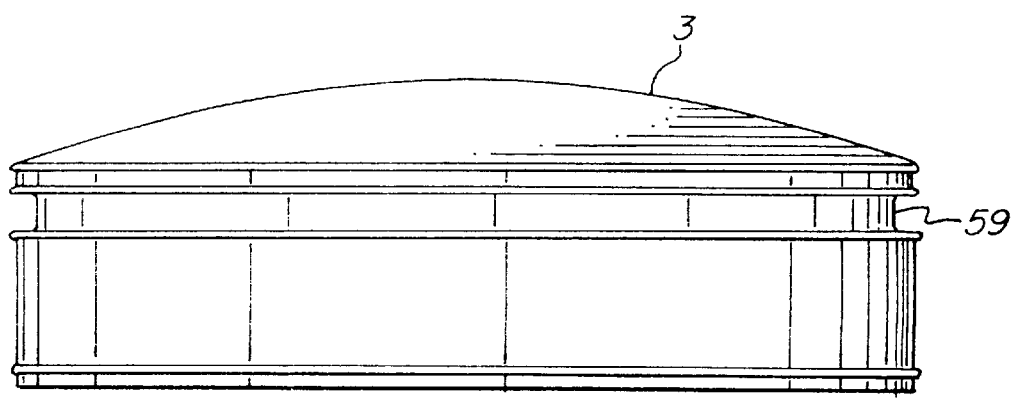
FIG. 8b is a side view of the piston 3 shown in FIG. 8a, but still without an O-ring 58.

FIG. 8b shows a side view of the piston 3 with a groove 59 for the O-ring 58.

Figure 8C:
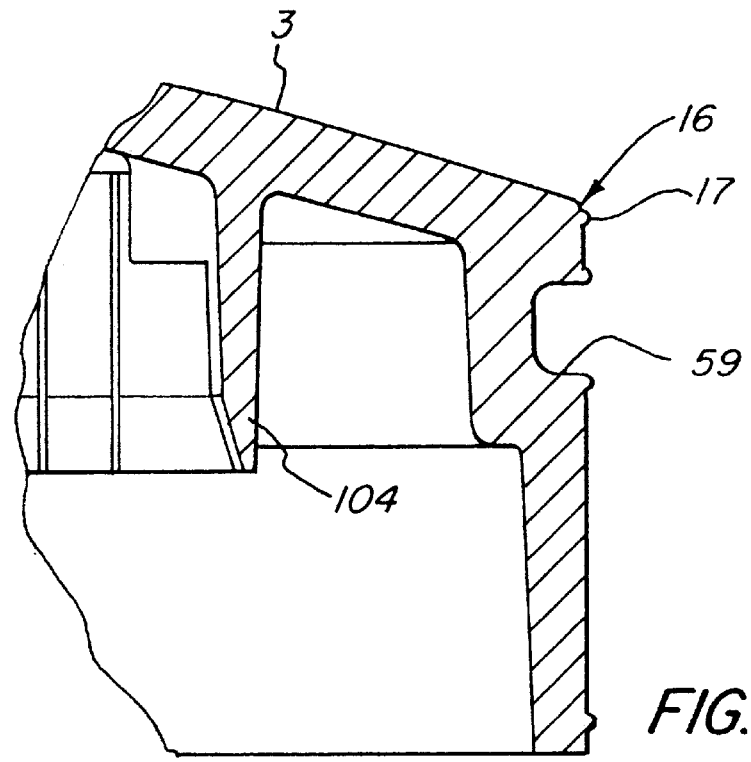
FIG. 8c is a cross-sectional view of a part of the piston within the X-circle shown in FIG. 8d with the previously described stiffening elements 57, with a groove for the O-ring 58 and a sealing body 16 disposed at the piston side, as part of the piston 3.
Figure 8D:
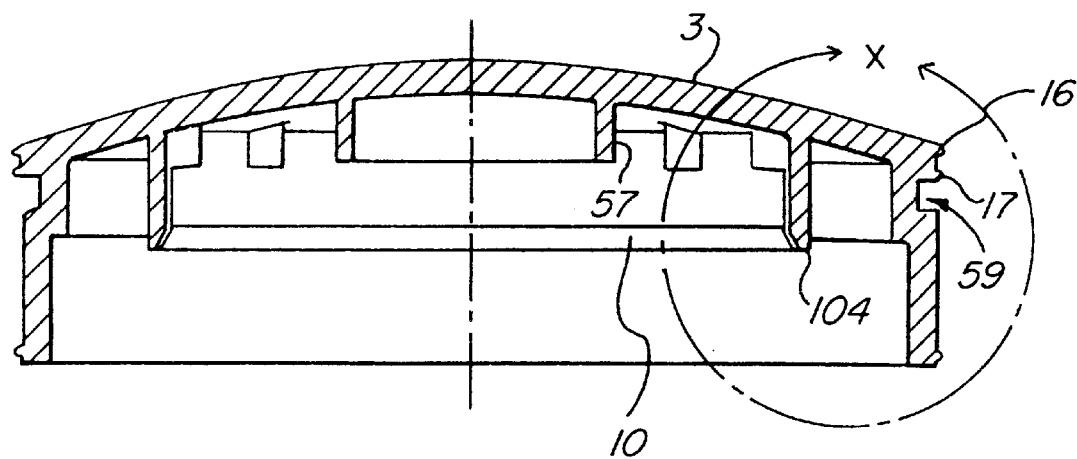
FIG. 8d is a view in cross-section through the piston with the stiffening element 57 for centering the plate 10.

FIG. 8c shows an enlarged cross-sectional view of a part of the piston illustrated in FIG. 8b, with the above-described stiffening elements 57 (FIG. 8d), the groove 59 for the O-ring and sealing bodies 16 disposed at the side of the piston, as part thereof. The sealing bodies seal off the cylinder chamber relative to the housing.

FIG. 8d shows once again an overall view in cross-section through the piston with the stiffening element 57 for centering the plate 10.

Figure 9:
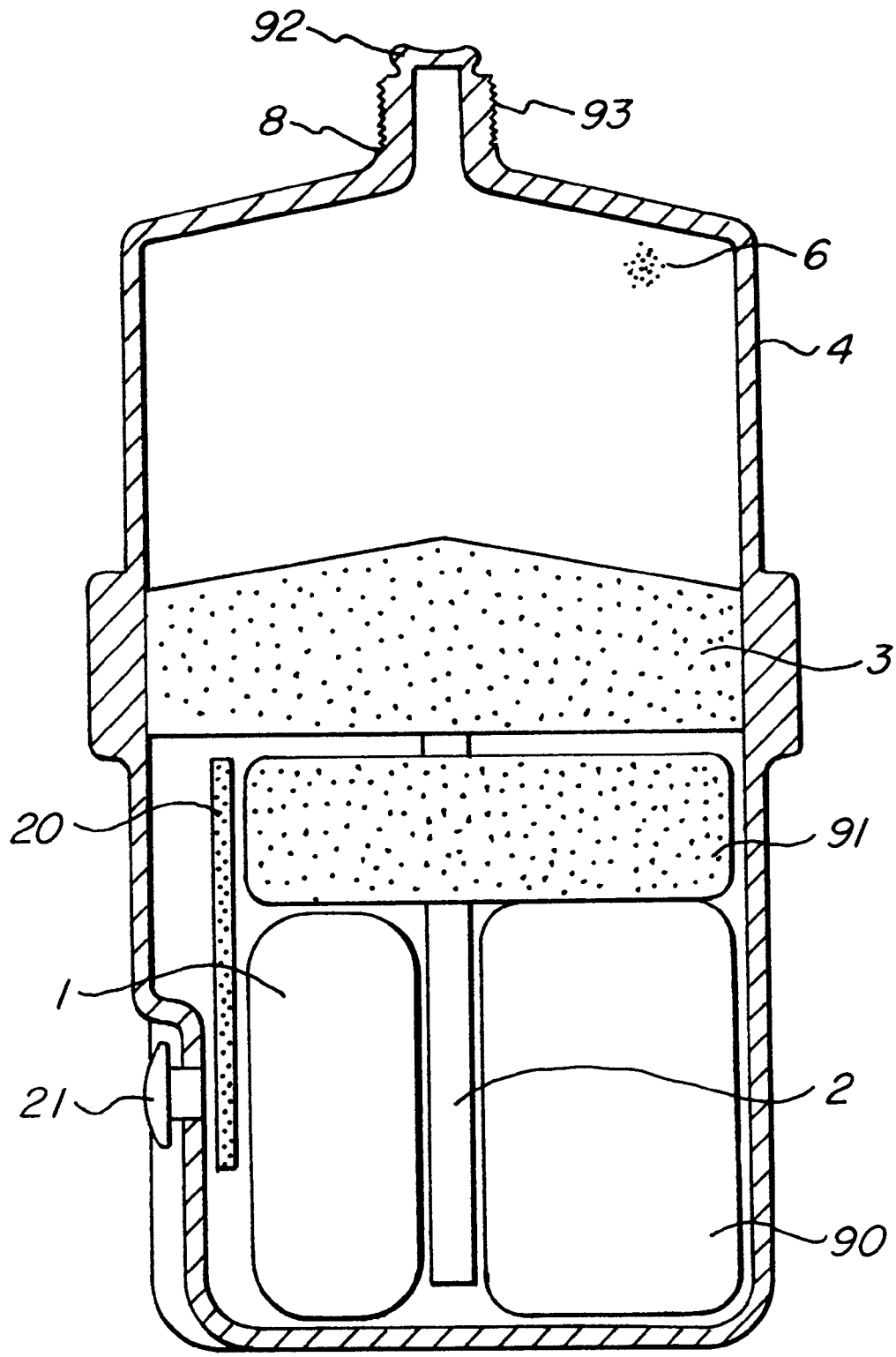
FIG. 9 is a further view in cross-section showing the principle of the lubricant dispenser.
Figure 11A:
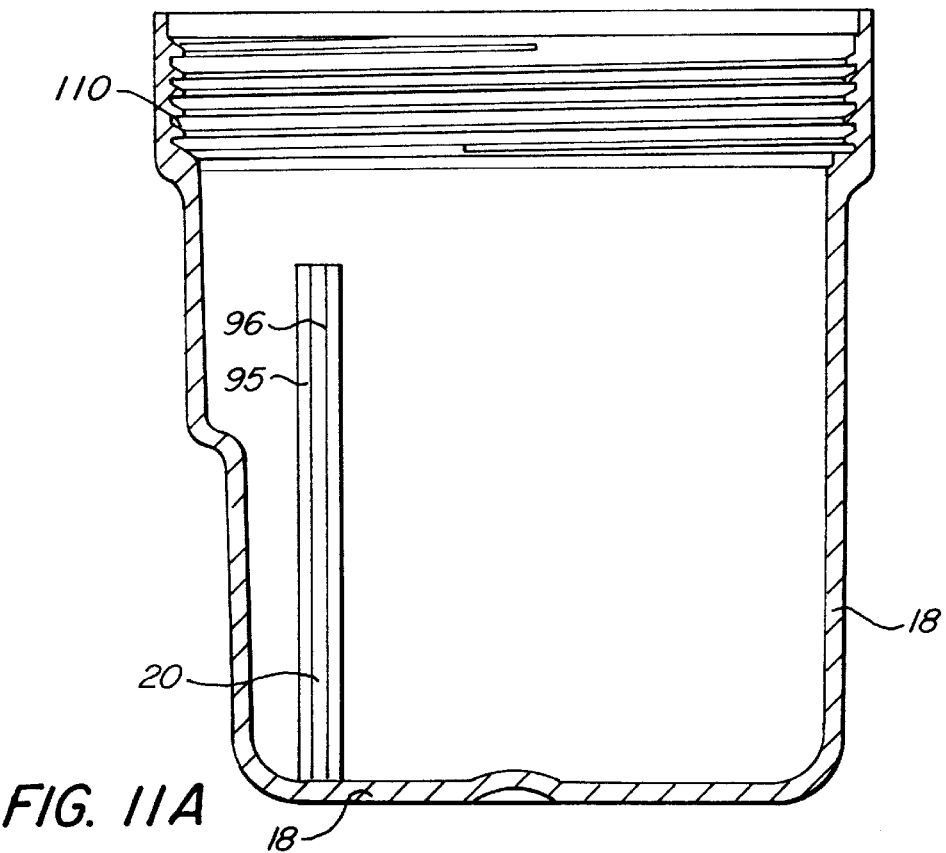
FIG. 11a is a view in cross-section through the housing.

As seen in FIG. 9 the motor for driving the piston forwardly is preferably a dc motor 90 which is actuated by an electronic system. The rotary movement of the motor shaft (not shown) is stepped down, for example in a ratio of 1:6221 by way of the transmission 91 which is preferably in the form of a gear transmission. The lubricant delivery apparatus is supplied with power by means of the battery 1, wherein the batteries preferably comprise three alkaline miniature cells, as shown in FIG. 11a, which are packed in mutually juxtaposed relationship in a stocking-type tube, which are connected in series and which are wired complete with a plug contact. In the assembly operation the plug only has to be plugged into the plug socket provided on the electronic arrangement (not shown).

Rotation of the motor is converted into a linear movement of the piston, as follows:

Disposed in the last gear of the transmission is a screwthreaded bushing. A screwthreaded or feed bar or rod 2 which is prevented from rotating is disposed in the screwthreaded bushing. When now the last gear is rotated by activation of the motor 90, the screwthreaded rod is rotated. The pitch of the screwthread is very slight and is preferably 0.5 mm. When therefore the motor rotates 6221 times, the last gear has performed an entire revolution and the screwthreaded or feed rod 2 and therewith also the piston 3 have covered a travel distance of 0.5 mm. A poorly reflecting region is also disposed on the first driven gear of the transmission 91.

Disposed on the electronic arrangement are push-button switches, two plug sockets—2-pole for the battery and 6-pole for the motor and the sensor—a microprocessor, a timing quartz and various resistors. Those parts are fitted using surface mounted devices (SMD).

Regarding the mode of operation of the electronic arrangement:

Disposed on the first driven gear is the poorly reflecting region which has already been mentioned above, for example a black, matt plastic stuck-on portion which reflects considerably more poorly than the brass of the gear. An optical infra-red sensor is fitted into the transmission plate which is above the gear. That sensor comprises a transmitter and a receiver. It is now accurately predetermined by the electronic arrangement how often a signal must come from the sensor in order to have completed the entire travel distance. Thereafter the system switches off exactly after the preset travel time.

Tests were carried out to ascertain how long it takes, with an internal pressure in the cylinder of 4 bars, to obtain X-signals from the sensor. That describes the 'worst case'. If the X-signals have not been detected in that predetermined time, the system switches off as either there must be a technical defect (motor, battery, transmission or sensor) or the pressure of 4 bars has been exceeded (motor speed is reduced).

That is advantageous as, during the running time, the speed of rotation also can or will change because of temperature or battery voltage influences; the arrangement ensures however that the same amount of lubricant is always urged out of the cylinder.

Two resistors are disposed on the electronic arrangement, for presetting the running times. As there are four positions at which those resistors can be disposed, there are four different options which denote four different running times, for example 1, 3, 6 or 12 months.

It is predetermined for the control arrangement that, in a 12-month mode of operation, lubrication is to be effected approximately every 6 hours in order to ensure a supply of lubricant to places requiring lubrication, in a one-shift operating procedure. Therefore a pressure is built up in the cylinder every 6 hours, in the case of a 12-month dispenser. As the duration of the pressure build-up is always the same, the different running times differ only in that the interval between lubricant dispensing differs. A 6-month dispenser therefore operates every 3 hours, a 3-month dispenser operates every 90 minutes and a 1-month dispenser operates every 30 minutes. This is advantageous as, with a short running time, it is important for the pulses to come as quickly after each other as possible in order to approximate as closely as possible to a permanent build-up of pressure. That is of lesser significance when dealing with long running times.

As described above the activation pin is previously pressed into the cover. When the user presses that activation pin entirely into the housing of the lubricant delivery apparatus, the system is activated.

A marking on the activation pin, for example a colour marking, indicates to the user what presetting is programmed in the case of the lubricant dispenser to be used.

After activation, automatic adjustment of the sensor initially occurs. As the electronic arrangement predetermines the time in which X-signals must come from the sensor, the intensity of the sensor is altered until the receiver has received that signal in optimum fashion. That is effected by the provision of 16 different settings for the sensor current, which at the same time denotes a change in brightness of the transmitter. If the intensity of the transmitter is too great, it may be that the black stick-on portion reflects the infra-red beam. If the level of intensity is too low, the brass of the gear could also not reflect. That automatic adjustment of the sensor takes about 4 seconds. If the predetermined number of signals should not be detected in that time, the system runs for a further 4 seconds without however further adjustment. If the system switches off after 4 seconds, the sensor is operating in the optimum fashion and the system is in order. If however the system does not run at all or it runs for 8 seconds, there is a defect.

The quantitative delivery of lubricant is influenced by a predetermined setting of the duration of lubricant delivery, in accordance with the teaching disclosed in DE-A-43 21 552. This involves an open-loop control. In contrast, in the lubricant dispenser described in accordance with the invention, the amount of lubricant is monitored directly and not by way of a period of time. For that purpose, the delivered volume of lubricant is measured by way of the above-described electronic arrangement and the feed of lubricant is stopped after the delivery of a predetermined volume - this corresponds to the corresponding forward feed travel. The volume of the delivered amount of lubricant is therefore measured by way of the number of motor revolutions or signal pulses. This involves a closed regulating circuit which is substantially different from the open-loop control of DE-A-43 21 552.

FIG. 9 shows a further view in principle of the lubricant delivery apparatus according to the invention with batteries 1 for the power supply, a feed rod or bar 2 which is driven by a motor 90, and wherein a transmission 91, preferably a step-down transmission, is disposed between the feed bar or rod 2 and the motor 90. The feed rod or bar is connected to the piston 3 which is arranged within a cylinder 4 with a transparent cylinder wall, with the above-described integrated scale. Disposed in the cylinder is lubricant 6 which can be delivered by way of a delivery opening 8. In the condition after manufacture of the lubricant dispenser, in which it is not yet ready for operation, the delivery opening 8 is provided with a closure cap 92 integrally connected to the delivery opening 8 or the wall of the cylinder. Before the lubricant dispenser is brought into use, the closure cap 92 must be removed, for example by cutting. On the outside the delivery region of the cylinder is also provided with a male screwthread 93 in order to be screwed into a lubricant location with a corresponding female screwthread.

Also indicated is the above-described on switch 21 as well as the board 20 disposed opposite the switch 21, with the electronic control arrangement on the board 20.

Figure 10:
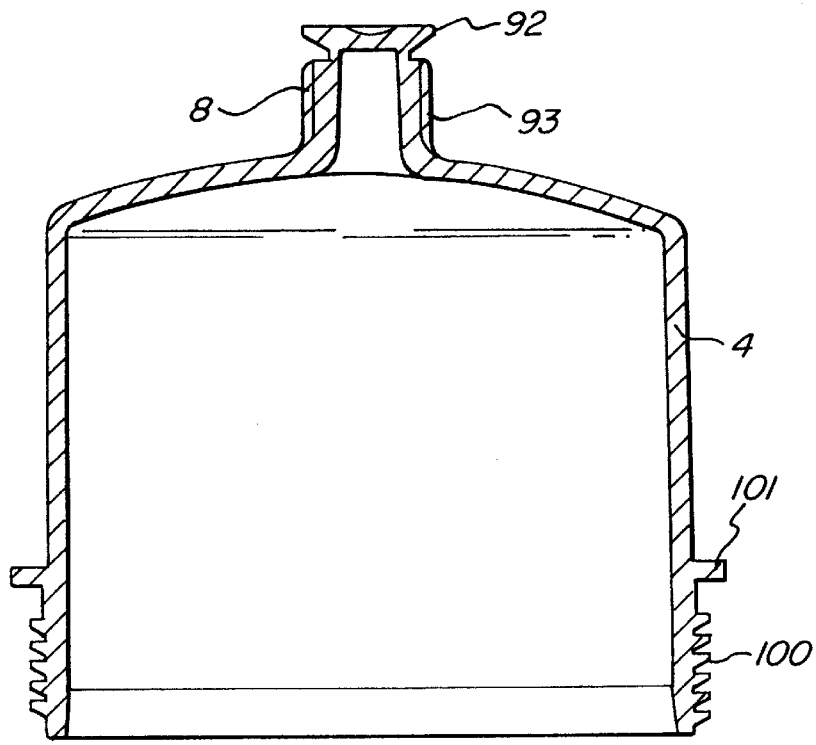
FIG. 10 is a view in cross-section through the cylinder.
Figure 12A:
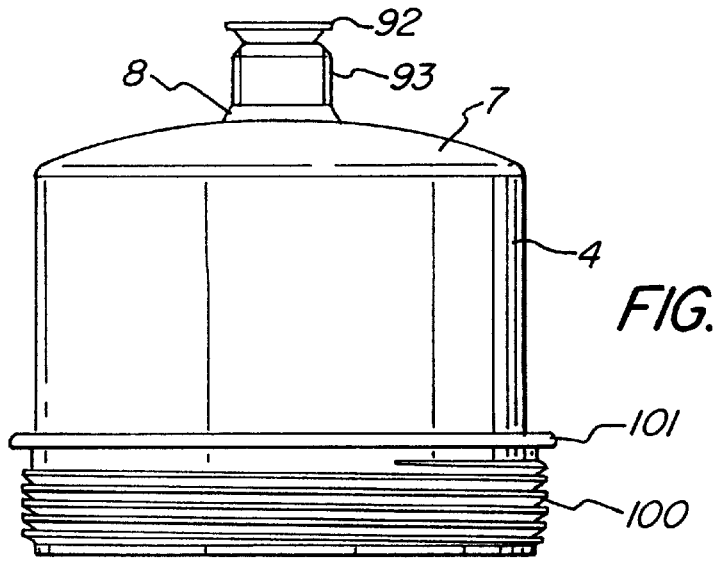
FIG. 12b is a view in cross-section of a part of the structure shown in FIG. 12a, and FIG. 13 is a view in cross-section of a stabilizer element.
Figure 12B:
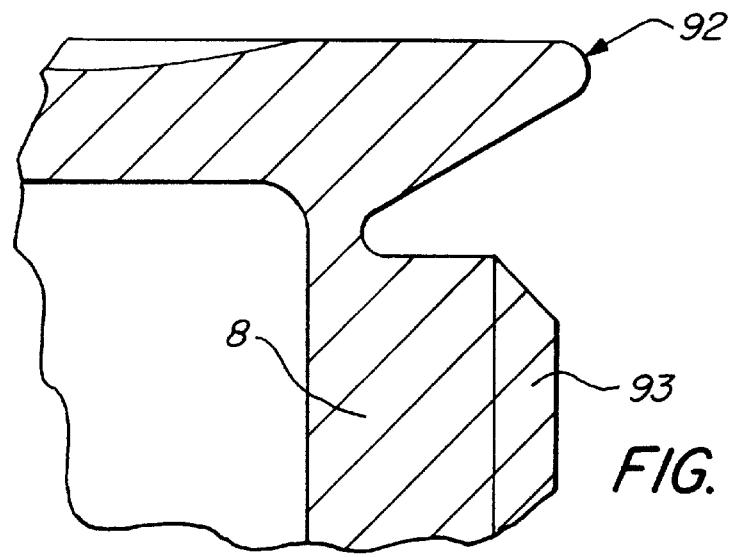

Preferably the outside periphery of the closure cap 92 projects beyond the male screwthread 93 so that the male screwthread can be screwed into a lubricant location, only after the closure cap has been previously detached. Such an embodiment is shown in FIGS. 10, 12a and 12b. FIG. 10 also shows a screwthread 100 which serves for screwing to a corresponding co-operating screwthread on the housing, see FIG. 11a. Preferably the cylinder is no longer releasable from the housing, after it has been screwed thereto. A rim flange portion 101 which faces away from the cylinder wall serves for better sealing and fixing of the screw closure.

Figure 11B:
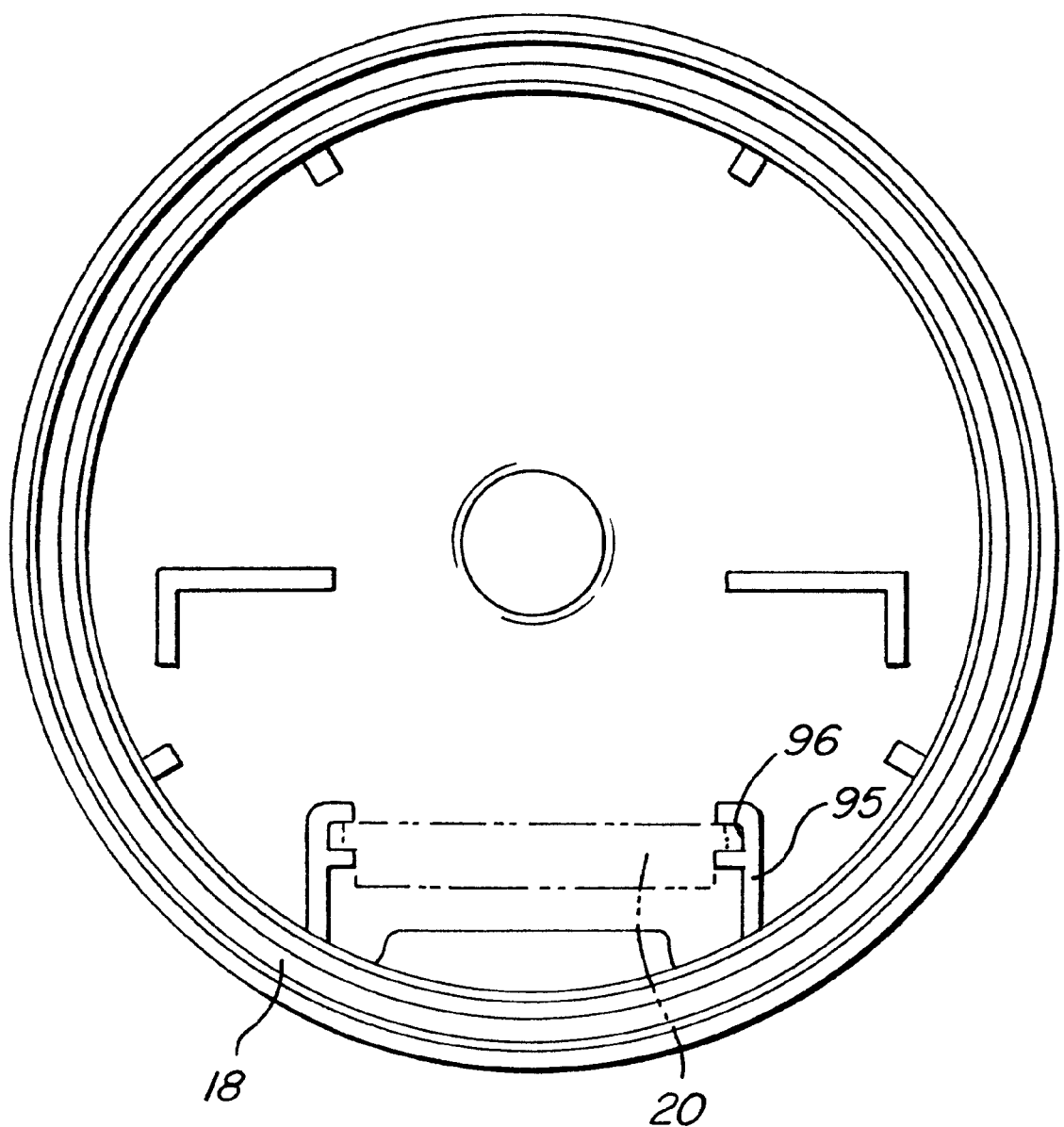
FIG. 11b is a view from the top of the housing in FIG. 11a, FIG. 12a is a view in side elevation of the cylinder.

FIG. 11a shows a further embodiment of the housing portion 18 of the lubricant delivery apparatus in which batteries 1, the electronic control board 20 and the other drive parts are disposed. As shown the control board 20 is disposed in a guide 95 for mechanical stabilization of the board. The guide 95 preferably comprises a groove 96 provided in the housing 18. Also shown on the connecting portion for connection to the cylinder with the lubricant is a female screwthread 110 which can be connected to the male screwthread 100 (see FIG. 10) of the cylinder 4. A further view of the housing 18 is shown in FIG. 11b, but as an end view which is turned through 90°.

FIG. 12a is a further view of the cylinder of the lubricant delivery apparatus with scale markings 37 (FIG. 1) applied thereto so that the user can see the condition of filling of the lubricant delivery apparatus.

FIG. 12b again clearly shows that the closure cap 92 is of a larger outside diameter than the male screwthread 93 so that the male screwthread can be screwed into a lubricant location only after prior detachment of the closure cap 92 which is integrally connected to the delivery region of the lubricant dispenser.

Figure 13:
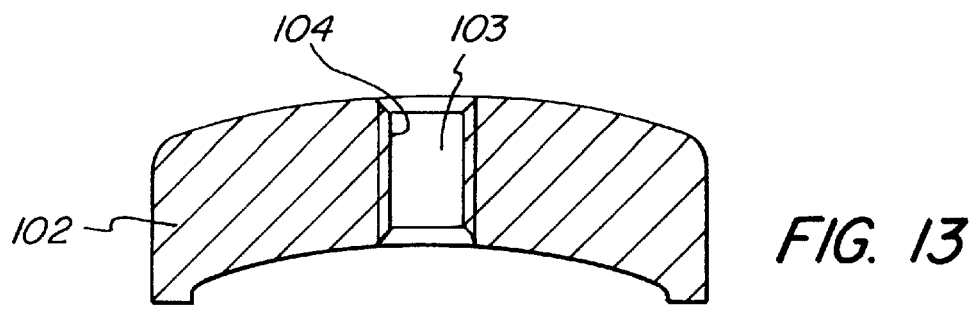

FIG. 13 shows a stabilizer element 102 with an opening 103 provided with a female screwthread 104 for receiving the lubricant dispenser with its male screwthread 93. The stabilizer element can be screwed on to a male screwthread of a lubricant location and can receive the lubricant delivery apparatus on the other side. A connection, which is looking in respect of shape, of the stabilizer element, is made possible by adaptation of the contour of the stabilizer element 102 to the outside edge of the lubricant dispenser. The stabilizer element can prevent the screwthread 93 from breaking away, particularly in the event of severe vibration.

If the stabilizer element comprises an elastic medium, the lubricant delivery apparatus can also be directly screwed to the lubricant location and the stabilizer element is then compressed and thus ensures a stable position for the lubricant delivery apparatus relative to the lubricant location.

It will be readily apparent to the man skilled in the art from the foregoing that each individual ones of the features such as the configuration of the piston, the sealing configuration between the piston and the cylinder, the means for switching on the automatic lubricant dispenser, the possibility of reading out the forward feed movement of the piston, the means for detecting pressure in the cylinder and the like improve the automatic lubricant dispensers which are known from the state of the art, and that the individual features can also be embodied independently of the other features without involving inventive activity in that respect.

I claim:

1. Apparatus for automatic lubricant delivery to a unit to be lubricated, comprising a piston arranged in a cylinder for movement in a direction to force lubricant from the cylinder, an electric-motor drive means connected thereto, and an on switch providing sealing protection, the on switch is arranged in an opening of a housing of the apparatus and upon activation the on switch does not project beyond an outside periphery of the lubricant delivery apparatus, wherein the on switch is of a cylindrical configuration and has two peripherally extending projections whose spacing relative to each other approximately corresponds to a wall thickness of the housing through which the on switch extends and that the second of the projections can be passed through the opening in which the on switch is fitted.

2. Apparatus according to claim 1, further comprising a contact means operationally connected with said on switch such that upon activation the on switch connects at least two contacts of the contact means to each other.

3. Apparatus according to claim 2, wherein the contact means is a spring contact disc which in an inactivate condition has a convex conductive plate which upon activation of the on switch is pressed into an activated condition in which the plate has a concave shape and the plate in the activated condition simultaneously touches two mutually juxtaposed contacts.

4. Apparatus according to claim 3, wherein the spring contact disc is arranged on a board together with a control unit and a microprocessor respectively.

5. Apparatus according to claim 1, wherein the on switch comprises sealing means which prevent media from penetrating into or issuing from the apparatus.

6. Apparatus according to claim 1, wherein the on switch does not have a switch-off function.

7. Apparatus according to claim 1, wherein the on switch is arranged in a depression of the housing of the apparatus and upon activation does not project beyond the outside periphery of the lubricant delivery apparatus.

8. Apparatus according to claim 1, further comprising a microprocessor and a memory connected thereto, such that the microprocessor is presettable to a given quantitative of lubricant delivery per time, which is triggerable by the on switch.

9. Apparatus according to claim 8, wherein the microprocessor has a signal input by way of which control signals for switching on the lubricant delivery can be supplied from the unit to be lubricated.

10. Apparatus according to claim 1, wherein the cylinder has a wall, which at least partially comprises transparent material and, along the direction of movement of the piston, has a length scale with indicia.

11. Apparatus according to claim 10, wherein the piston is at least partially provided with a clearly visible color to promote readability of the position of the piston in the cylinder.

12. Apparatus according to claim 1, wherein the apparatus can be switched between a winter mode of operation to a summer mode of operation and suitable quantity/time pre-settings are stored in a non-volatile memory (ROM).

13. Apparatus according to claim 1, wherein the electric-motor drive means is incrementally actuable by means of a control signal by a control signal generator.

14. Apparatus according to claim 13, wherein the electric-motor drive means is connected to a control unit which receives the control signal from the control signal generator such that a number of control signals outputted to the electric-motor drive is compared to a predetermined number of signals of the electric-motor drive means, and, in the event that the number of control signals outputted to the electric-motor drive is at least as great as the predetermined number of signals, the control unit switches off the electric-motor drive means.

15. Apparatus according to claim 14, further including a display unit which is connected to the control unit and displays measurement information about the number of control signals outputted to the electric-motor drive means.

16. Apparatus according to claim 1, further comprising means for detecting movement of the piston, such that the detection means, upon the movement of the piston, produces signals to be fed to a counting device; and comparison means which compares the number of signals to a predetermined stored value number.

17. Apparatus according to claim 16, wherein the comparison means are part of a control-evaluation unit which switches off the electric-motor drive means when the number of counted signals reaches the predetermined number of signals.

18. Apparatus according to claim 1, wherein the cylinder and the housing are releasably connected together and are preferably releasable from each other only by means of a special tool.

19. Apparatus according to claim 1, further comprising a delivery region with a delivery opening which is closable by a closure cap, that the delivery region is provided on an outside portion with a screwthread, and that the closure cap is of a larger outside diameter than the screwthread.

20. Apparatus according to claim 11, wherein sealing bodies associated with the piston are at least partially provided with a clearly visible color to promote readability of the position of the piston in the cylinder.

21. Apparatus according to claim 10, wherein sealing bodies associated with the piston are at least partially provided with a clearly visible color to promote readability of the position of the piston in the cylinder.

22. Apparatus according to claim 15, wherein the display unit also displays measurement information about a maximum number of control signals to be outputted.

23. Apparatus according to claim 14, further including a display unit which is connected to the control unit and displays measurement information about a maximum number of control signals to be outputted.

24. Apparatus according to claim 16, wherein movement of the piston is detected by detecting movement of the electric-motor drive means.

* * * * *

UNITED STATES PATENT AND TRADEMARK OFFICE
CERTIFICATE OF CORRECTION

PATENT NO. : 6,012,551
DATED : January 11, 2000
INVENTOR(S) : Bjorn Raab

It is certified that error appears in the above-identified patent and that said Letters Patent is hereby corrected as shown below:

On the title page: Item [22], "1995"

should be --1996--.

Signed and Sealed this

Fifth Day of September, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 6,012,551
DATED : January 11, 2000
INVENTOR(S) : Bjorn Raab

It is certified that error appears in the above-identified patent and that said Letters Patent is hereby corrected as shown below:

In column 9, line 38, "1" should be --1a--.

Signed and Sealed this

Twenty-fourth Day of October, 2000

Attest:

Attesting Officer

Q. TODD DICKINSON
Director of Patents and Trademarks

UNITED STATES PATENT AND TRADEMARK OFFICE
CERTIFICATE OF CORRECTION

PATENT NO. : 6,012,551

DATED : January 11, 2000

INVENTOR(S) : Björn Raab

It is certified that error appears in the above-identified patent and that said Letters Patent is hereby corrected as shown below:

On the title page, Item [75], "Bramerhaven" should read --Bremerhaven--.

Signed and Sealed this

Ninth Day of January, 2001

Attest:

Q. TODD DICKINSON

Attesting Officer

Commissioner of Patents and Trademarks